United States Patent
Lawrence et al.

(10) Patent No.: US 10,584,630 B2
(45) Date of Patent: Mar. 10, 2020

(54) POWER-BASED TURBOCHARGER BOOST CONTROL TECHNIQUES

(71) Applicants: David A Lawrence, Lake Orion, MI (US); Ethan Bayer, Lake Orion, MI (US); John Bucknell, Royal Oak, MI (US)

(72) Inventors: David A Lawrence, Lake Orion, MI (US); Ethan Bayer, Lake Orion, MI (US); John Bucknell, Royal Oak, MI (US)

(73) Assignee: FCA US LLC, Auburn Hills, MI (US)

(*) Notice: Subject to any disclaimer, the term of this patent is extended or adjusted under 35 U.S.C. 154(b) by 82 days.

(21) Appl. No.: 15/586,806

(22) Filed: May 4, 2017

(65) Prior Publication Data
US 2017/0350313 A1 Dec. 7, 2017

Related U.S. Application Data

(60) Provisional application No. 62/345,974, filed on Jun. 6, 2016.

(51) Int. Cl.
*F02B 37/18* (2006.01)
*F02B 37/12* (2006.01)
(Continued)

(52) U.S. Cl.
CPC ............ *F02B 37/183* (2013.01); *F02B 37/12* (2013.01); *F02B 37/162* (2019.05); *F02B 37/18* (2013.01);
(Continued)

(58) Field of Classification Search
CPC ...... F02B 37/183; F02B 37/12; F02B 37/127; F02B 37/18; F02B 2037/122;
(Continued)

(56) References Cited

U.S. PATENT DOCUMENTS 5,845,627 A 12/1998 Olin et al.
6,167,342 A 12/2000 Itoyama et al.
(Continued)

FOREIGN PATENT DOCUMENTS

CN 105201639 A 12/2015
DE 10319347 A1 11/2004
(Continued)

OTHER PUBLICATIONS

Karnik A Y et al; "Electronic Throttle and Waste Gate Control for Turbocharged Gasoline Engines", American Control Conference, 2005. Proceedings of the 2005 Portland, OR, USA, Jun. 8-10, 2005, IEEE, Piscataway, NJ, USA, Jun. 8, 2005 (Jun. 8, 2005), pp. 4434-4439, XP010820500.
(Continued)

*Primary Examiner* — Laert Dounis
*Assistant Examiner* — Edward Bushard
(74) *Attorney, Agent, or Firm* — Ralph E Smith

(57) ABSTRACT

A power-based control system and method for an engine comprising a turbocharger involve obtaining a set of parameters that each affect exhaust gas energy and using the set of parameters to (i) determine a target mass flow into the engine and a target boost for the turbocharger to achieve a torque request, (ii) determine a target power for a compressor of the turbocharger to achieve the target engine mass flow and the target turbocharger boost, (iii) determine a target pressure ratio and a target mass exhaust flow for the turbine of the turbocharger to achieve a target turbine power equal to the target compressor power, and (iv) determine a target position of the wastegate valve to achieve the target turbine pressure ratio and mass exhaust flow, and commanding a wastegate valve to the target position.

16 Claims, 2 Drawing Sheets

(51) Int. Cl.
*F02D 41/00* (2006.01)
*F02D 41/14* (2006.01)
*F02B 37/16* (2006.01)
*F04D 25/04* (2006.01)
*F02D 23/00* (2006.01)

(52) U.S. Cl.
CPC ..... *F02D 41/0007* (2013.01); *F02D 41/1448* (2013.01); *F04D 25/04* (2013.01); *F02B 2037/122* (2013.01); *F02D 23/00* (2013.01); *F02D 2041/1433* (2013.01); *F02D 2200/0402* (2013.01); *Y02T 10/144* (2013.01)

(58) Field of Classification Search
CPC .. F02D 41/0007; F02D 41/1448; F02D 23/00; F02D 2041/1433; F02D 2200/0402; F04D 25/04
USPC .......................................................... 60/602
See application file for complete search history.

(56) References Cited

U.S. PATENT DOCUMENTS

| | | | |
|---|---|---|---|
| 6,732,523 B2 * | 5/2004 | Birkner | F02D 41/0007 60/605.1 |
| 7,478,533 B2 | 1/2009 | Ueno | |
| 7,565,236 B2 | 7/2009 | Turin et al. | |
| 7,748,217 B2 * | 7/2010 | Muller | F02D 41/0007 60/602 |
| 7,770,393 B2 | 8/2010 | Buckland et al. | |
| 7,788,922 B2 | 9/2010 | Müller | |
| 7,805,939 B2 | 10/2010 | Kimoto et al. | |
| 7,827,790 B2 | 11/2010 | Kimoto et al. | |
| 7,987,040 B2 | 7/2011 | Buckland et al. | |
| 8,082,091 B2 * | 12/2011 | Youssef | F02D 41/0007 60/602 |
| 8,195,311 B2 | 6/2012 | Karpman et al. | |
| 8,359,858 B2 | 1/2013 | Pursifull | |
| 8,428,835 B2 | 4/2013 | Habert et al. | |
| 9,181,905 B2 * | 11/2015 | Chi | F02D 41/0065 |
| 9,291,093 B2 * | 3/2016 | Wang | F02B 37/12 |
| 9,964,027 B2 * | 5/2018 | Hagari | F02B 37/18 |
| 2006/0196182 A1 | 9/2006 | Kimoto et al. | |
| 2006/0207252 A1 | 9/2006 | Isobe et al. | |
| 2008/0282698 A1 | 11/2008 | Ferrari et al. | |
| 2009/0019848 A1 | 1/2009 | Ballauf et al. | |
| 2009/0090106 A1 | 4/2009 | Muller | |
| 2011/0041493 A1 | 2/2011 | Doering et al. | |
| 2011/0264353 A1 | 10/2011 | Atkinson et al. | |
| 2013/0211693 A1 | 8/2013 | Petrovic et al. | |
| 2013/0282256 A1 | 10/2013 | Watanuki et al. | |
| 2014/0345255 A1 | 11/2014 | Zhu et al. | |
| 2015/0082788 A1 | 3/2015 | Wang et al. | |
| 2015/0101581 A1 | 4/2015 | Karacic et al. | |
| 2015/0204257 A1 | 7/2015 | Osumi | |
| 2016/0146130 A1 | 3/2016 | Haskara et al. | |
| 2016/0363043 A1 | 12/2016 | Hirayama | |
| 2017/0030259 A1 | 2/2017 | Tabata | |
| 2017/0044971 A1 | 2/2017 | Racca | |
| 2017/0145907 A1 | 5/2017 | Nishio et al. | |

FOREIGN PATENT DOCUMENTS

| | | |
|---|---|---|
| DE | 10201520096 A1 | 5/2016 |
| GB | 2502805 A | 12/2013 |
| GB | 2511767 A | 9/2014 |

OTHER PUBLICATIONS

International Search Report and Written Opinion dated Jul. 18, 2017 for International Application No. PCT/US2017/033458, International Filing Date May 19, 2017.

International Search Report and Written Opinion dated May 24, 2017 for International Application No. PCT/US2017/020863, International Filing Date Mar. 6, 2017.

* cited by examiner

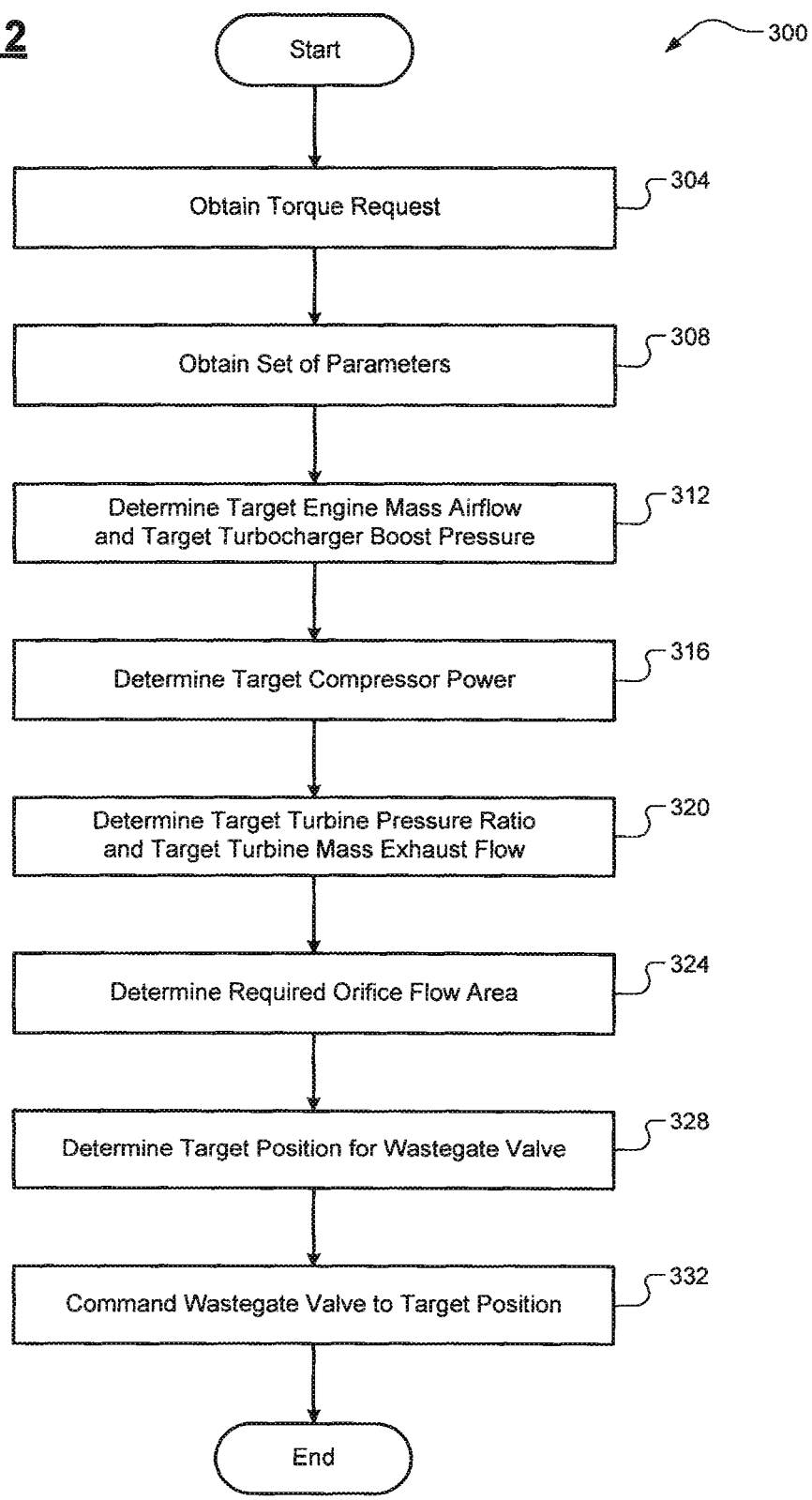

POWER-BASED TURBOCHARGER BOOST CONTROL TECHNIQUES

CROSS-REFERENCE TO RELATED APPLICATIONS

This application claims benefit of U.S. Provisional Application Ser. No. 62/345,974 filed on Jun. 6, 2016. The disclosure of the above application is incorporated herein by reference in its entirety.

FIELD

The present application generally relates to turbochargers and, more particularly, to techniques for power-based turbocharger boost control.

BACKGROUND

A turbocharger is a turbine-driven, forced-induction device that increases airflow into an internal combustion engine. A compressor, which is driven by a turbine, draws in ambient air and compresses it before it enters the engine at an increased pressure. This results in a greater mass of air entering cylinders of the engine on each intake stroke, which increases the engine's efficiency through decreased throttling losses and increases the engine's power output. Kinetic energy of exhaust gas produced by combustion of the air and a fuel within the cylinders is then utilized to drive the turbine of the turbocharger.

Conventional control strategies for vehicle turbocharger systems are often inefficient from the perspective of both man hours required to calibrate and effectiveness of the control strategy. One potential source of this inefficiency is the large number of interconnected components (the compressor, the turbine, a throttle valve, a wastegate valve, variable camshaft actuators, etc.) and their varying fluid effects. These conventional turbocharger control techniques can involve extensive calibration and recalibration efforts, if other control calibrations are changed (such as spark timing or variable camshaft timing), which is difficult and sometimes infeasible, particularly right before vehicle production. Accordingly, while such turbocharger control systems work for their intended purpose, there remains a need for improvement in the relevant art.

SUMMARY

According to one aspect of the invention, a control system for an engine comprising a turbocharger is presented. In one exemplary implementation, the system comprises a wastegate valve configured to variably open and close to control a pressure of exhaust gas in an exhaust system of the engine at a turbine of the turbocharger; and a controller configured to: obtain a set of parameters that each affect exhaust gas energy; using the set of parameters: (i) determine a target mass flow into the engine and a target boost for the turbocharger to achieve a torque request; (ii) determine a target power for a compressor of the turbocharger to achieve the target engine mass flow and the target turbocharger boost, (iii) determine a target pressure ratio and a target mass exhaust flow for the turbine of the turbocharger to achieve a target turbine power equal to the target compressor power, and (iv) determine a target position of the wastegate valve to achieve the target turbine pressure ratio and mass exhaust flow, and command the wastegate valve to the target position.

In some implementations, the controller is configured to utilize a complete model of the turbocharger to determine the target compressor power, the target pressure ratio and the target mass exhaust flow for the turbine, and the target position of the wastegate valve.

In some implementations, the controller is configured to determine the target compressor power using a compressor power model portion of the complete turbocharger model, the compressor power model utilizing the following equation:

$$P_C = \frac{\dot{m} c_p T_{1C}}{\eta_C}\left(PR^{(\frac{\gamma-1}{\gamma})} - 1\right),$$

where $P_C$ is the target compressor power, $\dot{m}$ is the target compressor mass flow, $c_p$ and $\gamma$ are a specific heat and a specific heat ratio of intake air, respectively, $T_{1C}$ is a compressor inlet temperature, PR is a compressor pressure ratio, which represents a ratio between compressor outlet pressure and compressor inlet pressure, and $\eta_C$ represents compressor efficiency.

In some implementations the controller is configured to determine the target turbine pressure ratio and mass exhaust flow using a turbine power model portion of the complete turbocharger model, the turbine power model being based on the following equation:

$$P_T = \dot{m}\eta_T c_p T_{1T}\left(1 - PR^{(\frac{\gamma-1}{\gamma})}\right),$$

where $P_T$ is the target turbine power, $\dot{m}$ is the target turbine mass exhaust flow, $c_p$ and $\gamma$ are a specific heat and a specific heat ratio of exhaust gas, respectively, $\eta_T$ represents turbine efficiency, $T_{1T}$ is a turbine inlet temperature, and PR represents a turbine pressure ratio, which represents a ratio between turbine outlet and inlet pressures.

In some implementations, the controller is further configured to: determine an orifice flow area for the wastegate valve to achieve the target turbine pressure ratio and the target turbine mass exhaust flow; and determine the target position of the wastegate valve to achieve the determined orifice flow area. In some implementations, the wastegate valve is an electrically-actuated wastegate valve that comprises an electric actuator configured to variably open and close the wastegate valve.

In some implementations, the controller is configured to determine the orifice flow area using a wastegate model portion of the complete turbocharger model, the wastegate model utilizing the following equation:

$$CdA = \frac{\dot{m}}{\rho PR^{(\frac{1}{\gamma})}\sqrt{\frac{2R}{MW}T_0\left(\frac{\gamma}{\gamma-1}\right)\left(1-PR^{(\frac{\gamma-1}{\gamma})}\right)}},$$

where CdA is the required flow orifice area for the wastegate valve, $\dot{m}$ is the wastegate exhaust mass flow, $\gamma$ is the specific heat ratio of the exhaust gas, $\rho$ represents turbine inlet density, R represents the ideal gas constant, MW represents the molecular weight of the exhaust gas, and PR is the turbine pressure ratio.

In some implementations, the set of parameters comprise compressor inlet temperature, compressor inlet and outlet pressure, turbine inlet temperature, and turbine inlet and outlet pressure. In some implementations, the controller is configured to optimally control the position of the wastegate valve independent of a configuration of the engine.

According to another aspect of the invention, a method of controlling an engine comprising a turbocharger is presented. In one exemplary implementation, the method comprises obtaining, by a controller, a set of parameters that each affect exhaust gas energy; using the set of parameters: (i) determining, by the controller, a target mass flow into the engine and a target boost for the turbocharger to achieve a torque request; (ii) determining, by the controller, a target power for a compressor of the turbocharger to achieve the target engine mass flow and the target turbocharger boost; (iii) determining, by the controller a target pressure ratio and a target mass exhaust flow for a turbine of the turbocharger to achieve a target turbine power equal to the target compressor power; and (iv) determining, by the controller, a target position of a wastegate valve to achieve the target turbine pressure ratio and mass exhaust flow, the wastegate valve being configured to variably open and close to control a pressure of the exhaust gas in an exhaust system of the engine at the turbine; and commanding, by the controller, the wastegate valve to the target position.

In some implementations, the method further comprises utilizing, by the controller, a complete model of the turbocharger in determining the target compressor power, the target pressure ratio and the target mass exhaust flow for the turbine, and the target position of the wastegate valve.

In some implementations, the controller is configured to determine the target compressor power using a compressor power model portion of the complete turbocharger model, the compressor power model utilizing the following equation:

$$P_C = \frac{\dot{m} c_p T_{1C}}{\eta_C} \left( PR^{\left(\frac{\gamma-1}{\gamma}\right)} - 1 \right),$$

where $P_C$ is the target compressor power, $\dot{m}$ is the target compressor mass flow, $c_p$ and $\gamma$ are a specific heat and a specific heat ratio of intake air, respectively, $T_{1C}$ is a compressor inlet temperature, PR is a compressor pressure ratio, which represents a ratio between compressor outlet pressure and compressor inlet pressure, and $\eta_C$ represents compressor efficiency.

In some implementations, the controller is configured to determine the target turbine pressure ratio and mass exhaust flow using a turbine power model portion of the complete turbocharger model, the turbine power model being based on the following equation:

$$P_T = \dot{m} \eta_T c_p T_{1T} \left( 1 - PR^{\left(\frac{\gamma-1}{\gamma}\right)} \right),$$

where $P_T$ is the target turbine power, $\dot{m}$ is the target turbine mass exhaust flow, $c_p$ and $\gamma$ are a specific heat and a specific heat ratio of exhaust gas, respectively, $\eta_T$ represents turbine efficiency, $T_{1T}$ is a turbine inlet temperature, and PR represents a turbine pressure ratio, which represents a ratio between turbine outlet and inlet pressures.

In some implementations, the method further comprises: determining, by the controller, an orifice flow area for the wastegate valve to achieve the target turbine pressure ratio and the target turbine mass exhaust flow; and determining, by the controller, the target position of the wastegate valve to achieve the determined orifice flow area. In some implementations, the wastegate valve is an electrically-actuated wastegate valve that comprises an electric actuator configured to variably open and close the wastegate valve.

In some implementations, the controller is configured to determine the orifice flow area using a wastegate model portion of the complete turbocharger model, the wastegate model utilizing the following equation:

$$CdA = \frac{\dot{m}}{\rho PR^{\left(\frac{1}{\gamma}\right)} \sqrt{\frac{2R}{MW} T_0 \left(\frac{\gamma}{\gamma-1}\right)^{\left(1 - PR^{\left(\frac{\gamma-1}{\gamma}\right)}\right)}}},$$

where CdA is the required flow orifice area for the wastegate valve, $\dot{m}$ is the wastegate exhaust mass flow, $\gamma$ is the specific heat ratio of the exhaust gas, $\rho$ represents turbine inlet density, R represents the ideal gas constant, MW represents the molecular weight of the exhaust gas, and PR is the turbine pressure ratio.

In some implementations, the set of parameters comprise compressor inlet temperature, compressor inlet and outlet pressure, turbine inlet temperature, and turbine inlet and outlet pressure. In some implementations, the controller is configured to optimally control the position of the wastegate valve independent of a configuration of the engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a flow diagram of an example method of operating a turbocharged engine according to the principles of the present disclosure.

DETAILED DESCRIPTION

Figure 1:
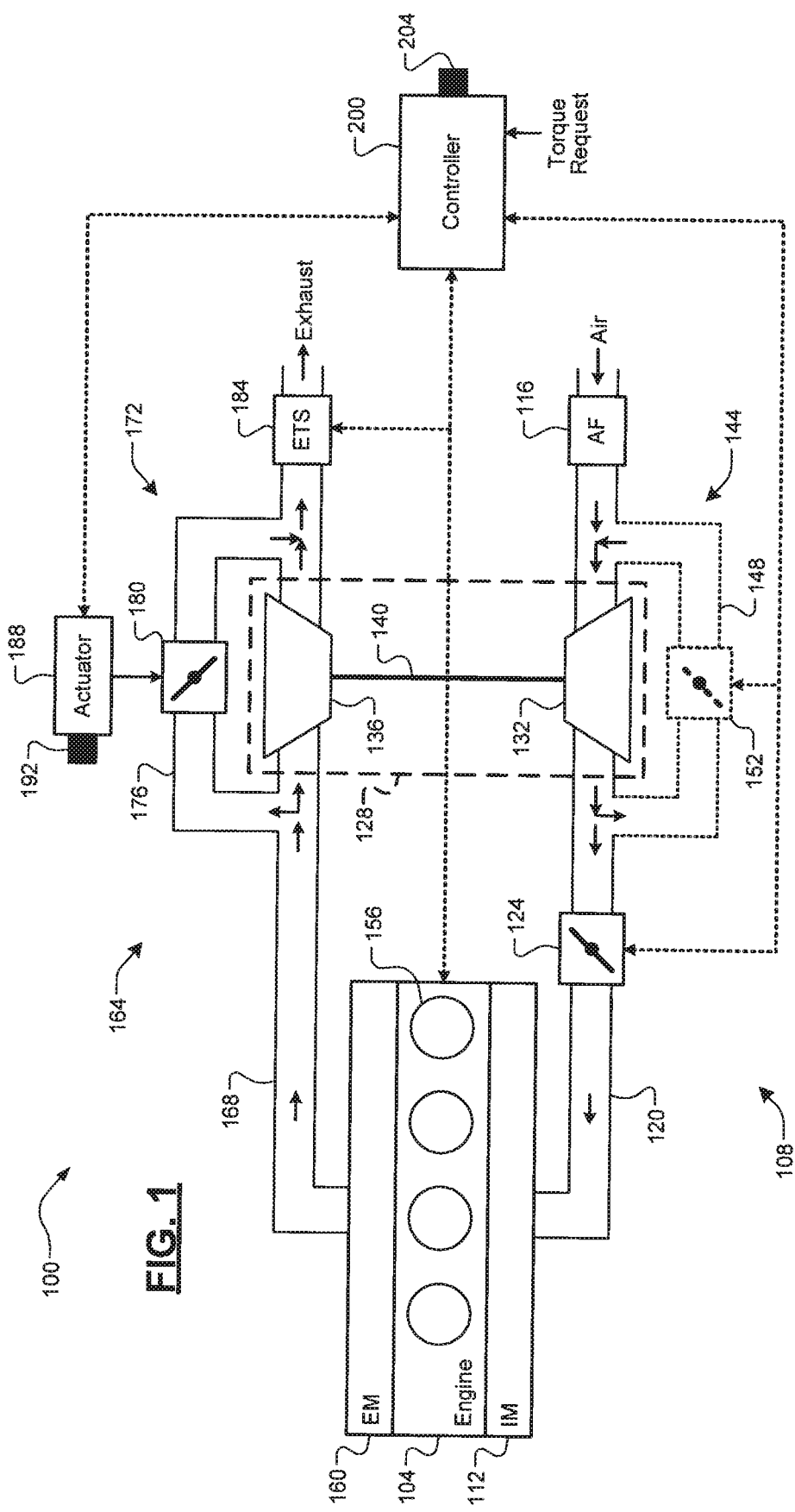
FIG. 1 is a diagram of an example vehicle comprising a turbocharged engine according to the principles of the present disclosure.

Vehicle turbocharger systems are configured to perform "boost control." Boost control aims to achieve an engine airflow demand (based on a driver's torque request) via positioning of a wastegate valve. The wastegate valve position, however, must change in response to not only airflow demand changes, but also in response to changes in operating conditions when airflow demand is unchanging. Non-limiting examples of these operating conditions include ambient air temperature, compressor inlet pressure (altitude changes), exhaust gas recirculation (EGR) configuration (e.g., low pressure vs. high pressure), throttle inlet pressure (TIP) reserve, spark timing, air/fuel ratio, and exhaust gas temperature.

As previously mentioned, conventional turbocharger systems perform empirical closed-loop control of the wastegate valve. For example, this could include empirical-based feed-forward control with boost pressure sensor feedback for closed-loop proportional-integral-derivative (PID) control. Empirical-based methods, however, require extensive calibration and re-calibration, such as when other features are re-calibrated (valve lift, valve timing, spark timing, etc.). These methods also heavily rely upon PID feedback due to constrained feed-forward compensation for operating condition changes. This is a slow, reactive approach in which the system waits for error and then responds. Such systems are also dependent on the engine/component configuration (EGR, scavenging, variable valve control (VVC), secondary boosting devices, lean/rich operation, etc.).

Accordingly, power-based turbocharger boost control techniques are presented. These techniques utilize a complete physics-based model of a turbocharger for determining wastegate valve position based on a power demand of the turbocharger, while also automatically compensating for changing engine operating conditions and states. By utilizing this model and accounting for all operating conditions and states up front, the disclosed techniques are proactive in positioning the wastegate valve as opposed to the conventional reactive positioning techniques discussed above. These techniques are also independent of the engine/component configuration. Potential benefits include decreased calibration costs and improved vehicle efficiency (performance/responsiveness, fuel economy, etc.).

Referring now to FIG. 1, a diagram of an example vehicle 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140. The intake system 108 optionally comprises a recirculation system 144 comprising a recirculation passage 148 and a recirculation valve 152 for selectively bypassing the compressor 132.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provides to an exhaust system 164 comprising an exhaust passage 168. Kinetic energy of the exhaust gas drives the turbine 136, which in turn drives the compressor 132 via the shaft 140. A wastegate system 172 selectively bypasses the turbine 136 to regulate boost pressure (e.g., exhaust gas pressure at an inlet of the turbine 136. The wastegate system 172 comprises a bypass passage 176 and a wastegate valve 180 that regulates the flow of exhaust gas through an orifice (e.g., the bypass passage 176). An exhaust gas treatment system (ETS) 184, such as a catalytic converter, treats exhaust gas to decrease or eliminate emissions before it is released into the atmosphere. In one exemplary implementation, the wastegate valve 180 is electrically-actuated by an electric actuator 188 (e.g., an electric motor that displaces an arm coupled to the wastegate valve 180) that also has an associated position sensor 192.

A controller 200 controls operation of the vehicle 100. Examples of components controlled by the controller 200 include the engine 104, the throttle valve 124, the optional recirculation valve 152, the wastegate valve 180 (e.g., via electric actuator 188), and the exhaust treatment system 184. It will be appreciated that the controller 200 controls specific components of the vehicle 100 that are not illustrated, such as, but not limited to, fuel injectors, spark plugs, an EGR valve, a VVC system (e.g., intake/exhaust valve lift/actuation), a transmission, and the like. The controller 200 controls operation of these various components based on measured and/or modeled parameters. A set of one or more sensors 204 are configured to measure one or more parameters (pressures, temperatures, speeds, etc.) as discussed in greater detail herein. Other parameters could be modeled by the controller 200, e.g., based on other measured parameters. The controller 200 is also configured to perform the engine/turbocharger control techniques of the present disclosure, which are discussed in greater detail below.

Referring now to FIG. 2, a flow chart of an example method 300 of operating a turbocharged engine is illustrated. For explanatory purposes, components of the vehicle 100 will be referenced, but it will be appreciated that this method 300 could be used for any turbocharged engine. At 304, the controller 200 obtains a torque request for the engine 104. In one exemplary implementation, this torque request is based on input from a driver via an accelerator pedal. At 308, the controller 200 obtains a set of parameters that each affect exhaust gas energy (i.e., the current condition(s) at the turbine inlet). At least some of the parameters of the set of parameters will be utilized for each of the calculations discussed in greater detail below.

Examples of the parameters that affect exhaust gas energy include, but are not limited to: ambient (vehicle external) temperature, barometric pressure (altitude), throttle inlet pressure, intake manifold pressure, intake manifold temperature, turbine inlet temperature, compressor inlet pressure, compressor outlet pressure, compressor inlet temperature, turbine inlet pressure, turbine outlet pressure, spark retardation, engine coolant temperature, engine speed, intake air specific heat, exhaust gas specific heat, turbine inlet density, engine mass flow, enabled/disabled status of VVC and catalyst heating, target engine mass air flow, pressure losses across inlet system component(s) (e.g., air filter 116), air/fuel ratio, and current transmission gear. These parameters could be measured by sensors 204, modeled, or some combination thereof.

The following calculations/determinations each utilize at least some of the set of parameters obtained at 308. At 308, the controller 200 determines a target mass flow (air or air/EGR) into the engine 104 (e.g., a target compressor mass flow) and a target boost for the turbocharger 128 to achieve the torque request. At 316, the controller 200 determines a target power for the compressor 132 to achieve the target engine mass flow and the target turbocharger boost. As previously mentioned, the disclosed techniques utilize a complete physics-based model of the turbocharger 128, also referred to herein as a complete turbocharger model. The target compressor power determination is determined using a compressor power model portion of this complete model.

In one exemplary implementation, the compressor power model uses the following equation, along with calibrated compressor efficiency and speed maps:

$$P_C = \frac{\dot{m} c_p T_{1C}}{\eta_C} \left( PR^{\left(\frac{\gamma-1}{\gamma}\right)} - 1 \right), \quad (1)$$

where $P_C$ is the target compressor power, $\dot{m}$ is the target compressor mass flow (e.g., air or an air/exhaust mixture if EGR is utilized), $c_p$ and $\gamma$ are a specific heat and a specific heat ratio of intake air, respectively, $T_{1C}$ is a compressor inlet temperature, PR is a compressor pressure ratio, which represents a ratio between compressor outlet pressure and compressor inlet pressure (e.g., barometric pressure), optionally accounting for losses (e.g., across the air filter 116), and $\eta_C$ represents compressor efficiency. Using the above-referenced Equation (1), the compressor power model simultaneously computes both current and target compressor power and speed required to meet the torque request. The primary calibrations are the compressor efficiency and speed maps, which are both functions of corrected mass air flow and pressure ratio.

Because the compressor 132 and the turbine 136 are coupled together via the shaft 140, it will be assumed that the power demand for the compressor 132 is the same as the power demand for the turbine 136. Thus, a turbine power model portion of the complete turbocharger model utilizes the target (compressor) power along with current conditions at the inlet of the turbine 136 (e.g., the set of parameters) to compute a turbine pressure ratio and turbine mass exhaust flow to achieve the target power. This is illustrated at 320. At 320, the controller 200 determines the target pressure ratio and the target mass exhaust flow for the turbine 136 based on the target compressor power and the set of parameters.

In one exemplary implementation, the turbine power model based on the following equation:

$$P_T = \dot{m} \eta_T c_p T_{1T} \left( 1 - PR^{\left(\frac{\gamma-1}{\gamma}\right)} \right), \quad (2)$$

where $P_T$ is the target turbine power, $\dot{m}$ is the target turbine mass exhaust flow, $c_p$ and $\gamma$ are a specific heat and a specific heat ratio of exhaust gas, respectively, $\eta_T$ represents turbine efficiency, $T_{1T}$ is a turbine inlet temperature, and PR represents a turbine pressure ratio, which represents a ratio between turbine outlet and inlet pressures. Equation (2) is not used directly in the turbine power model; rather, it is the basis for a unique mathematical derivation, based on the relationship between turbine pressure ratio and power. This derivation solves a key problem: for a given turbine power target, both the required turbine pressure ratio and the turbine mass exhaust flow are unknown, and therefore neither set point can be computed directly.

The derivation results in a turbine model that consists of a turbine pressure ratio calibration map that is a function of corrected turbine power and corrected turbine speed. These maps, for example, could be calibrated versions of compressor and/or turbine speed maps provided by the turbocharger manufacturer. Using this turbine pressure ratio map, the required turbine pressure ratio can be explicitly determined, at which point determination of the turbine mass exhaust flow is straightforward using a standard turbine flow map, which is a function of the turbine pressure ratio and the corrected turbine speed. Therefore, the turbine power model comprises two primary calibrations: a turbine pressure ratio map and a turbine flow map. A noteworthy second function of this turbine power model is the computation of the current turbine pressure ratio, which is the basis for a backpressure model.

At 324 and 328, the controller 200 determines a position of the wastegate valve 180 to achieve the target pressure ratio and the target mass exhaust flow for the turbine 136. This can also be described as determining the wastegate flow area (e.g., CdA) that yields the required wastegate/turbine mass exhaust flow split, as illustrated by 324. This determination involves using a wastegate model portion of the complete turbocharger model. In one exemplary implementation, the determined position is a wastegate orifice flow area to achieve the target pressure ratio and the target mass exhaust flow for the turbine 136. This is also the point at which the physics-based features of the techniques become very clear. That is, the wastegate valve position is at its root being driven by a flow request, whereas a typical empirical system uses experimental data to estimate the physical position of the wastegate valve 180 straightaway for a fixed set of operating conditions.

In one exemplary implementation, the wastegate model utilizes the following equation:

$$CdA = \frac{\dot{m}}{\rho PR^{\left(\frac{1}{\gamma}\right)} \sqrt{\frac{2R}{MW} T_o \left(\frac{\gamma}{\gamma-1}\right) \left(1 - PR^{\left(\frac{\gamma-1}{\gamma}\right)}\right)}}, \quad (3)$$

where CdA is the required flow orifice area for the wastegate valve 180 (e.g., in mm$^2$), $\dot{m}$ is the wastegate mass exhaust flow, $\gamma$ is the specific heat ratio of the exhaust gas, $\mu$ represents turbine inlet density, R represents the ideal gas constant, MW represents the molecular weight of the exhaust gas, and PR is the turbine pressure ratio. By considering current and future conditions, the position of the wastegate valve 180 is optimized throughout a maneuver. For example, during a large torque request increase, the turbine flow requirement will tend to be higher than the current total exhaust port flow. In these situations, the disclosed techniques will automatically close the wastegate valve 180 fully until the total exhaust port flow accumulates and exceeds the turbine flow target, at which point the wastegate valve 180 will then open to meter or bleed off the excess exhaust gas flow.

Lastly, at 332, the controller 200 commands the wastegate valve 180 to the determined position. This determined position represents a position of the wastegate valve 180 that achieves the required flow orifice area discussed above, which is determined at 328 as illustrated. In one exemplary implementation, the controller 200 commands the electric actuator 188 to position the wastegate valve 180 at the determined position, e.g., based on feedback from position sensor 192. For example, certain positions of the electric actuator 188 could correspond to certain flow areas across the wastegate valve 180, and these relationships could be utilized to command the electric actuator 188 accordingly. After positioning the wastegate valve 180 appropriately at 332, the engine 104 is able to achieve increased efficiency and/or performance compared to typical empirical-based approaches. The method 300 then ends, but it will be appreciated that the method 300 could continually repeat during engine operation (e.g., every 10 milliseconds) to continuously optimize the position of the wastegate valve 180.

As previously discussed herein, the techniques of the present disclosure provide for, among other features and benefits, optimized turbocharge turbine energy management. Automatic compensation for operational conditions and/or changes is provided, such as for: altitude, humidity, transient maneuvers, shift torque management, knock spark retard, thermal enrichment, exhaust gas temperature and pressure, valve actuation strategy, ambient temperature, EGR system, and/or throttle inlet pressure. As also discussed above, the disclosed techniques are independent of the configuration of the vehicle or engine hardware, including: intake and exhaust system design, number of engine cylinders, EGR system design, lean/rich combustion strategy, scavenging strategy, intake and exhaust valve actuation technology, and secondary boosting devices.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine comprising a turbocharger, the system comprising:
  a wastegate valve configured to variably open and close to control a pressure of an exhaust gas in an exhaust system of the engine at a turbine of the turbocharger; and
  a controller configured to:
    obtain, from a set of one or more sensors, a set of parameters;
    using the set of parameters, determine a target position of the wastegate valve by performing the following steps:
      (i) determine a target engine mass flow into the engine and a target turbocharger boost for the turbocharger to achieve a torque request;
      (ii) determine a target power for a compressor of the turbocharger to achieve the target engine mass flow and the target turbocharger boost;
      (iii) derive a turbine model based on a turbine power model, the turbine power model based on at least one of a target turbine mass exhaust flow, an exhaust gas specific heat, an exhaust gas specific heat ratio, a turbine efficiency, a turbine inlet temperature, and a turbine pressure ratio of the turbine, wherein the derived turbine model includes a turbine pressure ratio calibration map that is a function of a corrected turbine power and a corrected turbine speed;
      (iv) determine a target turbine pressure ratio using the turbine pressure ratio calibration map of the derived turbine model and a target turbine power equal to the target compressor power;
      (v) determine a target mass exhaust flow using a turbine flow map and the target turbine pressure ratio, wherein the turbine flow map is a function of the target turbine pressure ratio and the corrected turbine speed; and
      (vi) determine the target position of the wastegate valve to achieve the target turbine pressure ratio and the target mass exhaust flow; and
    command the wastegate valve to the target position.

2. The system of claim 1, wherein the controller is configured to utilize a complete model of the turbocharger to determine the target compressor power, the target turbine pressure ratio and the target mass exhaust flow for the turbine, and the target position of the wastegate valve.

3. The system of claim 2, wherein the controller is configured to determine the target compressor power using a compressor power model portion of the complete turbocharger model, the compressor power model utilizing the following equation:

$$P_C = \frac{\dot{m} c_p T_{1C}}{\eta_C} \left( PR^{\left(\frac{\gamma-1}{\gamma}\right)} - 1 \right),$$

where $P_C$ is the target compressor power, $\dot{m}$ is a target compressor mass flow, $c_p$ and $\gamma$ are a specific heat and a specific heat ratio of intake air, respectively, $T_{1C}$ is a compressor inlet temperature, PR is a compressor pressure ratio, which represents a ratio between compressor outlet pressure and compressor inlet pressure, and $\eta_C$ represents compressor efficiency.

4. The system of claim 3, wherein the controller is configured to determine the target turbine pressure ratio and mass exhaust flow using the derived turbine model, which is a portion of the complete turbocharger model, the derived turbine model being derived from the following equation:

$$P_T = \dot{m} \eta_T c_p T_{1T} \left( 1 - PR^{\left(\frac{\gamma-1}{\gamma}\right)} \right),$$

where $P_T$ is the target turbine power, $\dot{m}$ is the target turbine mass exhaust flow, $c_p$ and $\gamma$ are the specific heat and the specific heat ratio of the exhaust gas, respectively, $\eta_T$ represents the turbine efficiency, $T_{1T}$ is the turbine inlet temperature, and PR represents the turbine pressure ratio, which represents a ratio between turbine outlet and inlet pressures.

5. The system of claim 4, wherein the controller is further configured to:
  determine an orifice flow area for the wastegate valve to achieve the target turbine pressure ratio and the target turbine mass exhaust flow; and
  determine the target position of the wastegate valve to achieve the determined orifice flow area.

6. The system of claim 5, wherein the wastegate valve is an electrically-actuated wastegate valve that comprises an electric actuator configured to variably open and close the wastegate valve.

7. The system of claim 5, wherein the controller is configured to determine the orifice flow area using a wastegate model portion of the complete turbocharger model, the wastegate model utilizing the following equation:

$$CdA = \frac{\dot{m}}{\rho PR^{\left(\frac{1}{\gamma}\right)}\sqrt{\frac{2R}{MW}To\left(\frac{\gamma}{\gamma-1}\right)^{\left(1-PR^{\left(\frac{\gamma-1}{\gamma}\right)}\right)}}},$$

where CdA is the required flow orifice area for the wastegate valve, $\dot{m}$ is the wastegate exhaust mass flow, $\gamma$ is the specific heat ratio of the exhaust gas, $\rho$ represents a turbine inlet density, R represents the ideal gas constant, MW represents the molecular weight of the exhaust gas, and PR is the turbine pressure ratio.

8. The system of claim 1, wherein the set of parameters comprise a compressor inlet temperature, a compressor inlet and outlet pressure, the turbine inlet temperature, and a turbine inlet and outlet pressure.

9. A method of controlling an engine comprising a turbocharger, the method comprising:
obtaining, by a controller and from a set of one or more sensors, a set of parameters;
using the set of parameters, determining a target position of a wastegate valve configured to variably open and close to control a pressure of the exhaust gas at a turbine of the turbocharger by performing the following steps:
(i) determining, by the controller, a target engine mass flow into the engine and a target turbocharger boost for the turbocharger to achieve a torque request;
(ii) determining, by the controller, a target power for a compressor of the turbocharger to achieve the target engine mass flow and the target turbocharger boost;
(iii) deriving, by the controller, a turbine model based on a turbine power model, the turbine power model based on at least one of a target turbine mass exhaust flow, an exhaust gas specific heat, an exhaust gas specific heat ratio, a turbine efficiency, a turbine inlet temperature, and a turbine pressure ratio of the turbine, wherein the derived turbine model includes a turbine pressure ratio calibration map that is a function of corrected turbine power and corrected turbine speed;
(iv) determining, by the controller, a target turbine pressure ratio using the turbine pressure ratio calibration map of the derived turbine model and a target turbine power equal to the target compressor power;
(v) determining, by the controller, a target mass exhaust flow using a turbine flow map and the target turbine pressure ratio, wherein the turbine flow map is a function of the target turbine pressure ratio and the corrected turbine speed; and
(vi) determining, by the controller, the target position of the wastegate valve to achieve the target turbine pressure ratio and the target mass exhaust flow; and
commanding, by the controller, the wastegate valve to the target position.

10. The method of claim 9, further comprising utilizing, by the controller, a complete model of the turbocharger in determining the target compressor power, the target turbine pressure ratio and the target mass exhaust flow for the turbine, and the target position of the wastegate valve.

11. The method of claim 10, wherein the controller is configured to determine the target compressor power using a compressor power model portion of the complete turbocharger model, the compressor power model utilizing the following equation:

$$P_C = \frac{\dot{m}c_p T_{1C}}{\eta_C}\left(PR^{\left(\frac{\gamma-1}{\gamma}\right)} - 1\right),$$

where $P_C$ is the target compressor power, $\dot{m}$ is a target compressor mass flow, $c_p$ and $\gamma$ are a specific heat and a specific heat ratio of intake air, respectively, $T_{1C}$ is a compressor inlet temperature, PR is a compressor pressure ratio, which represents a ratio between compressor outlet pressure and compressor inlet pressure, and $\eta_C$ represents compressor efficiency.

12. The method of claim 11, wherein the controller is configured to determine the target turbine pressure ratio and mass exhaust flow using the derived turbine model, which is a portion of the complete turbocharger model, the derived turbine model being derived from the following equation:

$$P_T = \dot{m}\eta_T c_p T_{1T}\left(1 - PR^{\left(\frac{\gamma-1}{\gamma}\right)}\right),$$

where $P_T$ is the target turbine power, $\dot{m}$ is the target turbine mass exhaust flow, $c_p$ and $\gamma$ are the specific heat and the specific heat ratio of the exhaust gas, respectively, $\eta_T$ represents the turbine efficiency, $T_{1T}$ is the turbine inlet temperature, and PR represents the turbine pressure ratio, which represents a ratio between turbine outlet and inlet pressures.

13. The method of claim 12, further comprising:
determining, by the controller, an orifice flow area for the wastegate valve to achieve the target turbine pressure ratio and the target turbine mass exhaust flow; and
determining, by the controller, the target position of the wastegate valve to achieve the determined orifice flow area.

14. The method of claim 13, wherein the wastegate valve is an electrically-actuated wastegate valve that comprises an electric actuator configured to variably open and close the wastegate valve.

15. The method of claim 13, wherein the controller is configured to determine the orifice flow area using a wastegate model portion of the complete turbocharger model, the wastegate model utilizing the following equation:

$$CdA = \frac{\dot{m}}{\rho PR^{\left(\frac{1}{\gamma}\right)}\sqrt{\frac{2R}{MW}To\left(\frac{\gamma}{\gamma-1}\right)^{\left(1-PR^{\left(\frac{\gamma-1}{\gamma}\right)}\right)}}},$$

where CdA is the required flow orifice area for the wastegate valve, $\dot{m}$ is the wastegate exhaust mass flow, $\gamma$ is the specific heat ratio of the exhaust gas, $\rho$ represents a turbine inlet density, R represents the ideal gas constant, MW represents the molecular weight of the exhaust gas, and PR is the turbine pressure ratio.

16. The method of claim 9, wherein the set of parameters comprise a compressor inlet temperature, a compressor inlet and outlet pressure, the turbine inlet temperature, and a turbine inlet and outlet pressure.

\* \* \* \* \*